(12) United States Patent
Kim et al.

(10) Patent No.: US 12,005,539 B2
(45) Date of Patent: Jun. 11, 2024

(54) SELF-DETECTING APPARATUS FOR WORKPIECE-ORIGIN, MOBILE MACHINE TOOL HAVING THE SAME, AND METHOD FOR SELF-DETECTING WORKPIECE-ORIGIN OF MOBILE MACHINE TOOL USING THE MOBILE MACHINE

(71) Applicant: KOREA INSTITUTE OF MACHINERY & MATERIALS, Daejeon (KR)

(72) Inventors: Dong-Hoon Kim, Daejeon (KR); Joonyub Song, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 1049 days.

(21) Appl. No.: 16/814,045

(22) Filed: Mar. 10, 2020

(65) Prior Publication Data

US 2020/0331107 A1 Oct. 22, 2020

(30) Foreign Application Priority Data

Apr. 18, 2019 (KR) .................... 10-2019-0045629

(51) Int. Cl.
*B23Q 9/00* (2006.01)
*B23C 1/20* (2006.01)
(Continued)

(52) U.S. Cl.
CPC .............. *B23Q 1/64* (2013.01); *B23C 1/20* (2013.01); *B23Q 9/0028* (2013.01); *B23Q 15/24* (2013.01);
(Continued)

(58) Field of Classification Search
CPC .......... B23Q 17/24–17/2495; B23Q 15/20–26; G05B 19/401; G05B 2219/37067;
(Continued)

(56) References Cited

U.S. PATENT DOCUMENTS

| 5,468,099 | A  | * | 11/1995 | Wheetley | ............. | B23Q 9/0007 |
|           |    |   |         |          |              | 408/88 |
| 2003/0108395 | A1 | * | 6/2003 | Douglas | ................... | B23Q 9/02 |
|           |    |   |         |          |              | 408/76 |

(Continued)

FOREIGN PATENT DOCUMENTS

KR 10-1562863 B1 10/2015
RU 2752349 C1 * 7/2021

OTHER PUBLICATIONS

Lee et al., "Machined Shape Error Measurement and Self-origin Recognition of Workpiece for Mobile Machine Tool", Nov. 2017, Journal of the Korean Society of Manufacturing Technology Engineers 26:6, pp. 623-631.*

(Continued)

*Primary Examiner* — Erica E Cadugan
(74) *Attorney, Agent, or Firm* — Hauptman Ham, LLP

(57) ABSTRACT

In a self-detecting apparatus for workpiece-origin, a mobile machine tool having the self-detecting apparatus, a method for self-detecting the workpiece-origin, the self-detecting apparatus is equipped to the mobile machine tool and includes a vision sensor and a transmitting unit. The vision sensor obtains a point image marked to the workpiece, and detects a position of a workpiece-origin based on coincidence of focuses of the points. The transmitting unit provides an information obtained by the vision sensor to the mobile machine tool. The mobile machine tool is moved to (Continued)

the workpiece-origin, so as to coincide the focuses of the points, based on the provided point image obtained by the vision sensor.

5 Claims, 7 Drawing Sheets

(51) Int. Cl.
  *B23Q 1/64* (2006.01)
  *B23Q 15/24* (2006.01)
  *B23Q 15/26* (2006.01)
  *B23Q 17/24* (2006.01)
  *G05B 19/402* (2006.01)
(52) U.S. Cl.
  CPC ............ *B23Q 15/26* (2013.01); *B23Q 17/24* (2013.01); *B23Q 17/2414* (2013.01); *B23Q 17/2428* (2013.01)
(58) Field of Classification Search
  CPC ........... G05B 2219/37129; G05B 2219/37397; G05B 2219/37423; G05B 2219/37455; Y10T 409/306216–306608; Y10T 408/554–5565; Y10T 408/5612; G02B 6/4221; B23C 1/20; B27C 5/10
  USPC ........ 700/192; 409/175–182; 408/76–78, 88; 356/199
  See application file for complete search history.

(56) References Cited

U.S. PATENT DOCUMENTS

2015/0003927 A1\* 1/2015 Spishak ............... B23Q 9/0007
  408/77
2017/0239768 A1\* 8/2017 Frangi ..................... B23Q 9/00

OTHER PUBLICATIONS

Machine Translation of Lee et al., "Machined Shape Error Measurement and Self-origin Recognition of Workpiece for Mobile Machine Tool", Nov. 2017, Journal of the Korean Society of Manufacturing Technology Engineers 26:6, pp. 623-631.\*

\* cited by examiner

SELF-DETECTING APPARATUS FOR WORKPIECE-ORIGIN, MOBILE MACHINE TOOL HAVING THE SAME, AND METHOD FOR SELF-DETECTING WORKPIECE-ORIGIN OF MOBILE MACHINE TOOL USING THE MOBILE MACHINE

PRIORITY STATEMENT

This application claims priority under 35 U.S.C. § 119 to Korean Patent Application No. 10-2019-0045629, Apr. 18, 2019 in the Korean Intellectual Property Office (KIPO), the contents of which are herein incorporated by reference in their entireties.

BACKGROUND

1. Field of Disclosure

The present disclosure of invention relates a self-detecting apparatus for workpiece-origin, a mobile machine tool having the self-detecting apparatus, and a method for self-detecting the workpiece-origin of the mobile machine tool using the mobile machine tool, and more specifically the present inventions relates to a self-detecting apparatus for workpiece-origin, a mobile machine tool having the self-detecting apparatus, and a method for self-detecting the workpiece-origin of the mobile machine tool using the mobile machine tool, in which a workpiece-origin is automatically detected and is compensated when a workpiece is newly installed or is moved in the mobile machine tool performing a machining or drilling on a surface of the workpiece.

2. Description of Related Technology

In machining process, a workpiece-origin should be newly installed whenever a machining coordinate is changed or a new workpiece is installed, and the process of installing the workpiece-origin is one of main factors affecting machining quality such as accuracy, precision and so on.

Here, the workpiece-origin may be defined as a starting point of the machining along each axis for a workpiece, after the machine tool is returned to an original coordinate. Thus, a machining error may be generated when the workpiece-origin is installed incorrectly, and a processing time for installing the workpiece-origin correctly may cause the decrease of productivity.

Recently, as aerospace industry, wind power generation industry and wide plant industry are developed, needs for a relatively large or wide size products are increased. However, the conventional fixing frame based machining center is limited to be applied to those kinds of large or wide size products, even though the conventional machining center has high structural rigidity and high accuracy or precision. Thus, a mobile machine tool for the large or wide size products has been developed, but the mobile machine tool has a relatively low structural rigidity and low accuracy or precision. Accordingly, the technology using the mobile machine tool is normally used for painting or welding in which high accuracy or precision is unnecessary, but is hard to be applied to machining or drilling process in which high accuracy or precision is necessary.

In addition, in the mobile machine tool process, the machine tool is continuously moved and frequently returned to the workpiece-origin, and thus the accurate starting at or returning to the workpiece-origin is very important in the process, to decrease the machining time and the machining error.

Regarded prior art on Boltzmann equation is Korean patent No. 10-1562863.

SUMMARY

The present invention is developed to solve the above-mentioned problems of the related arts. The present invention provides a self-detecting apparatus for workpiece-origin of the mobile machine tool capable of automatically detecting and compensating a workpiece-origin when a new workpiece is installed or a working workpiece is moved in a mobile machine tool, so as to increase machining accuracy and machining precision, to decrease aligning error, and to increase machining productivity.

In addition, the present invention also provides a mobile machine tool having the self-detecting apparatus for workpiece-origin of the mobile machine tool.

In addition, the present invention also provides a method for self-detecting the workpiece-origin of the mobile machine tool using the mobile machine tool.

According to an example embodiment, the self-detecting apparatus for workpiece-origin is equipped to the mobile machine tool and includes a vision sensor and a transmitting unit. The vision sensor obtains a point image marked to the workpiece, and detects a position of a workpiece-origin based on coincidence of focuses of the points. The transmitting unit provides an information obtained by the vision sensor to the mobile machine tool. The mobile machine tool is moved to the workpiece-origin, so as to coincide the focuses of the points, based on the provided point image obtained by the vision sensor.

In an example, the self-detecting apparatus for workpiece-origin may further include a gap sensor detecting a distance to the marked point of the workpiece, and correcting a depth of the workpiece-origin based on the comparison between the distance and a reference distance. The transmitting unit may provide an information obtained by the gap sensor to the mobile machine tool. A length along a Z axis of the mobile machine tool may be corrected, based on the provided distance obtained by the gap sensor.

According to another example embodiment, a mobile machine tool includes a body, a machining part, a moving part, a controller and a self-detecting apparatus. The machining part is equipped to the body and machining a workpiece. The moving part moves the body along a surface of the workpiece. The controller controls a machining process of the machining part and a moving of the moving part. The self-detecting apparatus for workpiece-origin has a vision sensor. The vision sensor obtains a point image marked to the workpiece, and detects a position of a workpiece-origin based on coincidence of focuses of the points. The controller controls the moving part for the body to be moved to the workpiece-origin, so as to coincide the focuses of the points, based on the provided point image obtained by the vision sensor.

In an example, the self-detecting apparatus for workpiece-origin may further comprise a gap sensor detecting a distance to the marked point of the workpiece, and correcting a depth of the workpiece-origin based on the comparison between the distance and a reference distance. The controller may correct a length along a Z axis of the machining part, based on the provided distance obtained by the gap sensor.

In an example, the self-detecting apparatus for workpiece-origin may further include a transmitting unit providing an information obtained by the vision sensor and the gap sensor to the mobile machine tool.

In an example, the mobile machine tool may further comprise a height controller 140 disposed between the moving part and the body, to control a distance between the moving part and the body.

In an example, the controller may control a height of the height controller, to control a machining depth of the machining part.

In an example, the controller may correct a tilt angle of the body when the obtained image by the vision sensor for an initial workpiece-origin image is different from a rectangular shape, so that the obtained image may be to be the rectangular shape.

In an example, the mobile machine tool may further comprise a height controller 140 disposed between the moving part and the body, to control a distance between the moving part and the body. The controller may control a height of the height controller, to control the tilt angle of the body.

In an example, the controller may correct the workpiece-origin of the machining part by the tilt angle.

According to still another example embodiment, in a method of self-detecting the workpiece-origin of the mobile machine tool, the point image marked to the workpiece is obtained, using the vision sensor (step S10). Edges of four points are detected (step S20). A reference coordinate of the workpiece-origin is compared with the edges (step S30). The coincidence of the focuses of the points is decided (step S40). The mobile machine tool is moved to correct an X coordinate and a Y coordinate, when the focuses of the points are not coincided with each other (step S50).

In an example, the method may further include comparing a pattern of the point image based on the obtained image in the step S10 (step S60), deciding the coincidence of the pattern (step S70), and moving the mobile machine tool to correct a tiling position along a yaw axis, when the pattern is not coincided with each other (step S80).

In an example, the method may further include obtaining a distance of the point using a gap sensor (step S100), comparing the distance between the point and the mobile machine tool obtained in the step S100, with a reference distance (step S110), deciding the coincidence of the distance with the reference distance (step S120), and moving the mobile machine tool to correct a tilting position along a pitch axis, when the distance is not coincided with each other (step S130).

According to the present example embodiments, the workpiece-origin may be accurately and precisely detected in the mobile machine tool, and thus the mobile machine tool may easily process the machining or the drilling on a surface of a relatively large sized workpiece. In addition, the mobile machine tool may easily process the additional machining or maintaining woks to the large sized workpiece without disassembling the workpiece.

In addition, the workpiece-origin may be accurately and precisely detected, so that the machining or the drilling may be performed accurately and precisely in the mobile machine tool.

In addition, the nose may be less affective in the machining or the drilling using the mobile machine tool.

In addition, the vision sensor obtaining the image of the workpiece-origin and the gap sensor measuring the depth of the workpiece-origin are used, and thus the workpiece-origin of the workpiece may be detected without contact.

In addition, the alignment of the workpiece is processed with an image, and the deviation of the workpiece from a reference coordinate is correctly detected, and then the position of the workpiece-origin is calculated to be transferred to the machine tool, so that the aligning error may be minimized.

In addition, the tiling correction is performed to increase the recognition or the detection of the workpiece-origin on a curved surface of the workpiece. Thus, the workpiece-origin is correctly detected on the curved surface of the workpiece, and thus, the machining or the drilling using the mobile machine tool may be accurately or precisely performed for the relatively large sized workpiece with various kinds of curved surfaces such as an aircraft, a vessel and so on.

DETAILED DESCRIPTION

Figure 1:
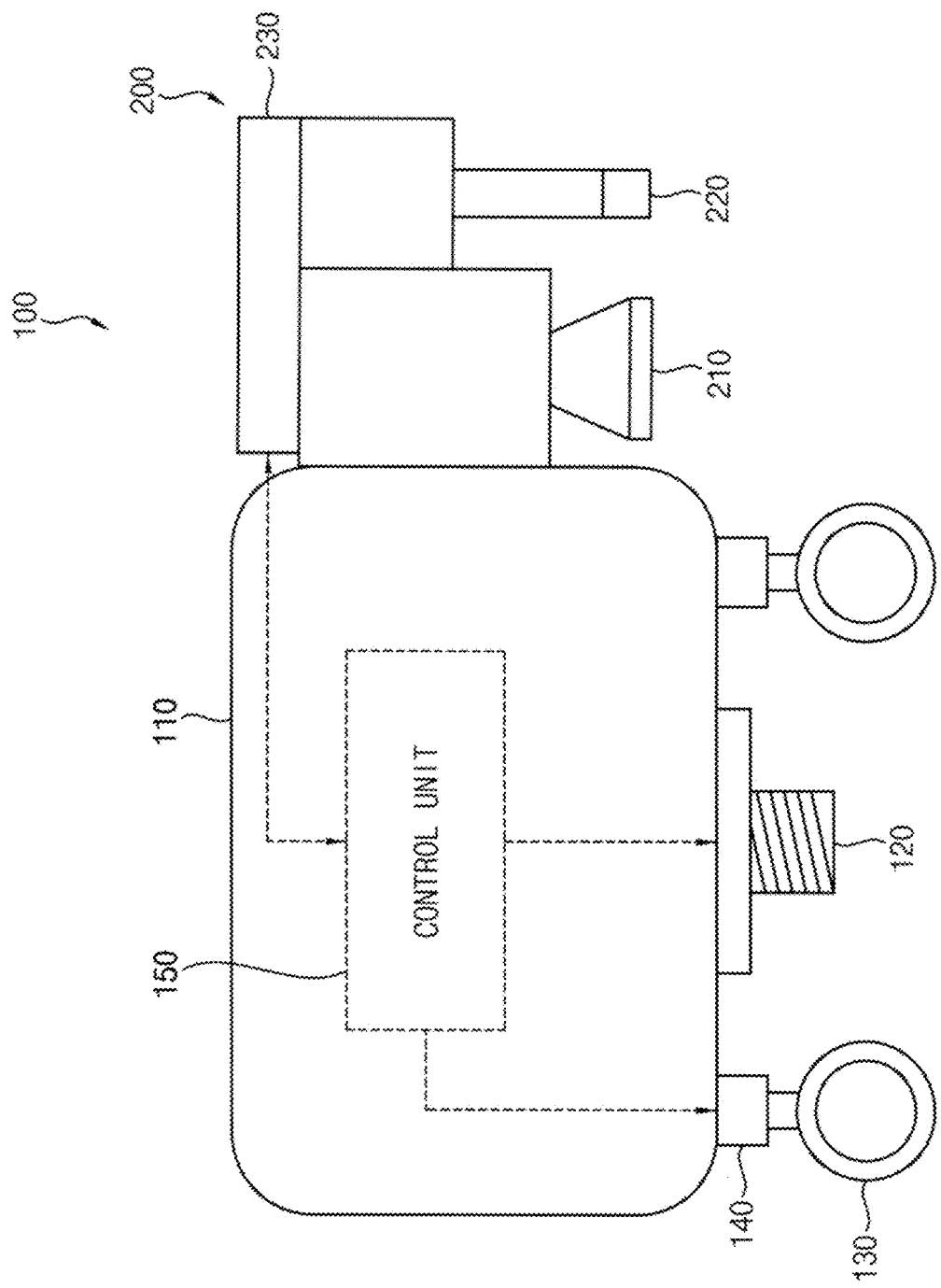
FIG. 1 a schematic view illustrating a mobile machine tool according to an example embodiment of the present invention.

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiment of the invention will be explained in detail with reference to the accompanying drawings.

FIG. 1 a schematic view illustrating a mobile machine tool according to an example embodiment of the present invention.

Referring to FIG. 1, the mobile machine tool 100 includes a body 110, a machining part/tool 120 equipped to the body 110 and machining a workpiece, a mover/moving part 130 moving the body 110 along a surface of the workpiece, a main controller 150 controlling a machining process of the machining part 120 and a moving of the moving part 130, and a self-detecting apparatus for workpiece-origin 200 (hereinafter, self-detecting apparatus).

In addition, the mobile machine tool 100 further includes a height controller 140. The height controller 140 is disposed between the moving part 130 and the body 110, and controls a distance or a height between the moving part 130 and the body 110. The height controller 140 controls the height of the moving part 130, to control an inclination between the body 110 and the surface of the workpiece. Thus, the mobile machine tool 100 may control a tilt angle between the surface of the workpiece and the machining part 120.

Here, in the present example embodiment, the self-detecting apparatus 200 is equipped for automatically detecting a workpiece-origin and compensating the workpiece-origin when a new workpiece is installed to the machine tool 100 or the machine tool 100 moves back to an initial position after the machining.

The self-detecting apparatus 200 is configured to obtain an image of the surface of the workpiece, and thus includes a vision sensor 210 and a gap sensor 220. The vision sensor 210 obtains a point image marked to the workpiece-origin of the workpiece, and detects the workpiece-origin based on coincidence of focuses of the points. The gap sensor 220 detects a distance to the marked point of the workpiece, and corrects a depth of the workpiece-origin based on the comparison between the detected distance and a reference distance. Here, the reference distance may be predetermined or may be provided by a database (not shown).

Further, the self-detecting apparatus 200 may further include a transmitting unit 230 providing information obtained by the self-detecting apparatus 200 to the controller 150.

As mentioned above, the vision sensor 210 obtains the point image of the workpiece-origin of the workpiece and detects the workpiece-origin, and thus the transmitting unit 230 may provide the obtained point image of the workpiece-origin and the detected workpiece-origin, to the controller 150.

In addition, as mentioned above, the gap sensor 220 detects the distance to the marked point and corrects the depth of the workpiece-origin, and thus the transmitting unit 230 may provide the detected distance to the marked point and the corrected depth of the workpiece-origin, to the controller 150.

Here, a direction substantially parallel with the surface of the workpiece is defined as an X axis direction, a direction substantially parallel with the surface of the workpiece and perpendicular to the X axis direction is defined as an Y axis direction, and a direction substantially perpendicular to both of the X axis and Y axis directions is defined as a Z axis direction. Then, the vision sensor 210 detects coordinates along the X axis direction and the Y axis direction of the workpiece-origin, which is defined as an X coordinate and a Y coordinate. The gap sensor 220 detects a coordinates along the Z axis direction of the workpiece-origin, which is defined as a Z coordinate.

When the workpiece has a plane shape, the Z coordinate of the workpiece-origin is unnecessary. However, when the workpiece has a curved surface, the Z coordinate of the workpiece-origin should be considered in addition to the X and Y coordinates. Thus, in the present example embodiment, the gap sensor 220 detects the Z coordinate and corrects the Z coordinate.

Accordingly, the self-detecting apparatus 200 provides the coordinates which are obtained by the vision sensor 210 and the gap sensor 220, to the controller 150, via the transmitting unit 230. The controller 150 controls the moving part 130 based on the coordinates, to position the body 110 at the workpiece-origin accurately, and the controller 150 controls the height controller 140 to align the inclined angle between the body 110 and the surface of the workpiece to the workpiece-origin accurately. Then, the machining part 120 machines the workpiece.

An original coordinate for a machining coordinate is provided to the machine tool 100, when an initial original coordinate (both of absolute coordinate and relative coordinate) does not exist. Thus, the absolute and relative coordinates are provided to the machine tool 100, and the machining is performed with having the workpiece-origin obtained by the vision sensor 210 and the gap sensor 220. Then, the machine tool 100 may be moved back to the workpiece-origin if necessary, and the machine tool 100 may restart the machining from the workpiece-origin, regardless of the shape, size, material or any physical properties of the workpiece.

Hereinafter, a method for self-detecting the workpiece-origin using the mobile machine tool having the self-detecting apparatus is explained in detail.

FIG. 2, FIG. 3, FIG. 4A, FIG. 4B and FIG. 5 are schematic views illustrating a method for self-detecting the workpiece-origin using the mobile machine tool of FIG. 1.

Figure 2:
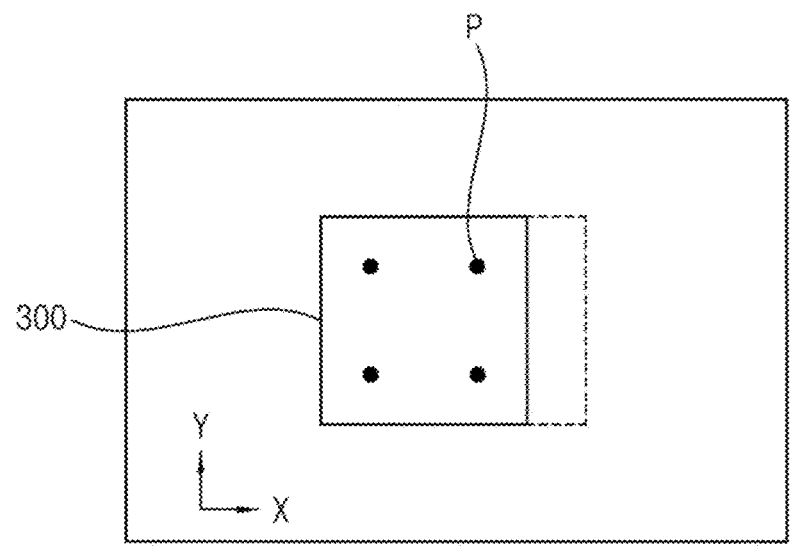
FIG. 2, FIG. 3, FIG. 4A, FIG. 4B and FIG. 5 are schematic views illustrating a method for self-detecting the workpiece-origin using the mobile machine tool of FIG. 1.
Figure 2:
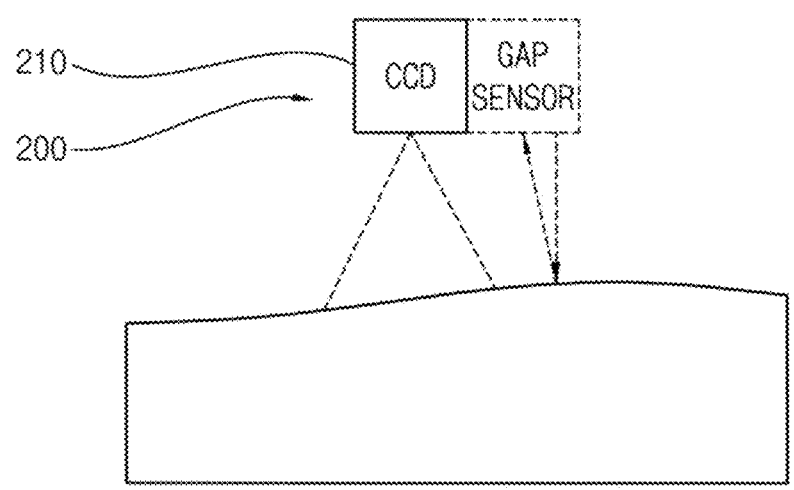

Referring to FIG. 2, the point P is marked at the workpiece 300, and the point P is used for the detection of the workpiece-origin. Here, the point P may be a four-point circular type point, or a one-point elliptical type point. In the present example embodiment, as illustrated in FIG. 2, the four-point circular type point is used as the point P, which means that four circular shape points are marked at the workpiece 300.

As illustrated in FIG. 2, the self-detecting apparatus 200 is moved to the point P, and then the vision sensor 210 obtains the image of the point P to be analyzed. Here, the image obtained by the vision sensor 210 is compared with a reference image of the point P, and then the X and Y coordinates of the workpiece-origin are detected.

Figure 3:
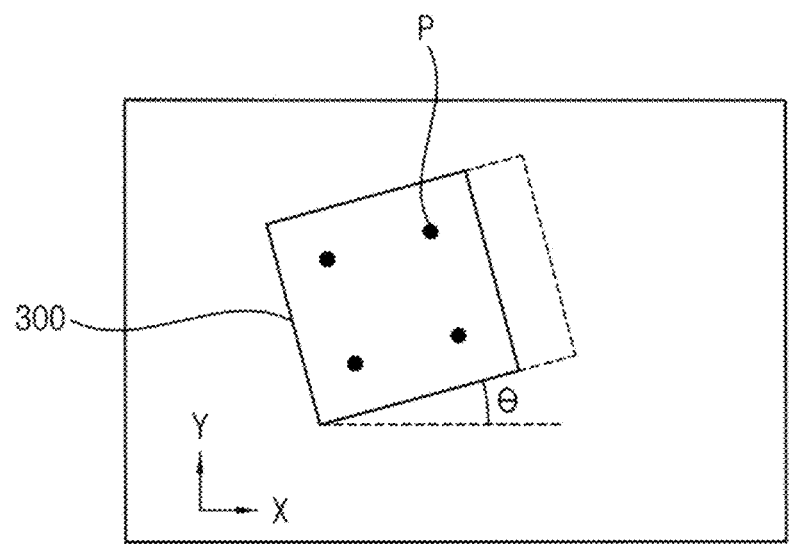
Figure 3:
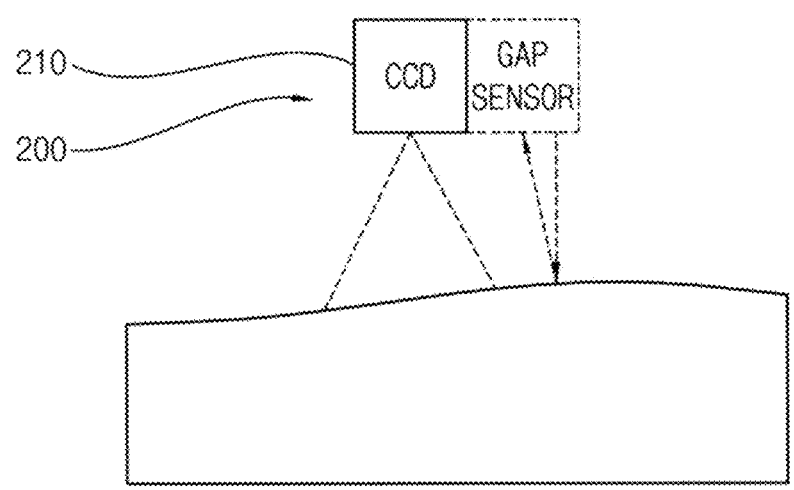

Here, as illustrated in FIG. 3, a yaw angle θ is also considered in addition to the X and Y coordinates of the point P, and thus the mobile machine tool 100 is tilted by the yaw angle θ, and then the mobile machine tool 100 may be positioned at the workpiece-origin, more accurately.

Figure 4A:
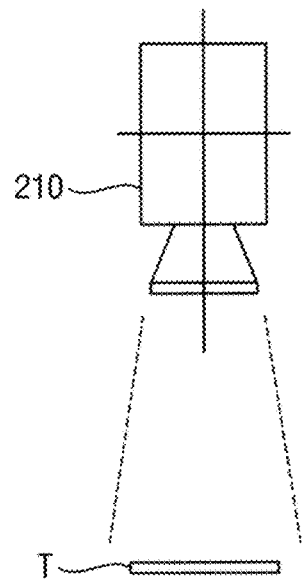
Figure 4A:
Figure 4B:
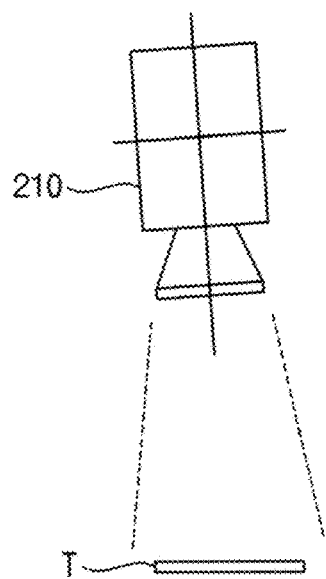
Figure 4B:

As illustrated in FIG. 4A, when the vision sensor 210 is parallel with a templet T having a rectangular shape, the templet T is obtained as the rectangular shape in the image obtained by the vision sensor 210. However, as illustrated in FIG. 4B, when the vision sensor 210 is not parallel with the templet T having the rectangular shape, the templet T is obtained as a trapezoidal shape in the image obtained by the vision sensor 210. Thus, as in the cases of FIG. 4B, the mobile machine tool 100 is tilted by the yaw angle θ, to correct the workpiece-origin, and then the obtained image for the templet T at the workpiece-origin may have the rectangular shape.

As a method for correcting the yaw angle θ of the machine tool 100, a hardware-type method and a software-type method may be used together. In the hardware-type method, the height of the height controller 140 is controlled by the yaw angle θ of the machine tool 100, such that the inclination of the body 110 of the machine tool 100 is controlled. In the software-type method, the machining position is corrected considering the machining error by the yaw angle θ between the machine tool 100 and the surface of the workpiece.

Figure 5:
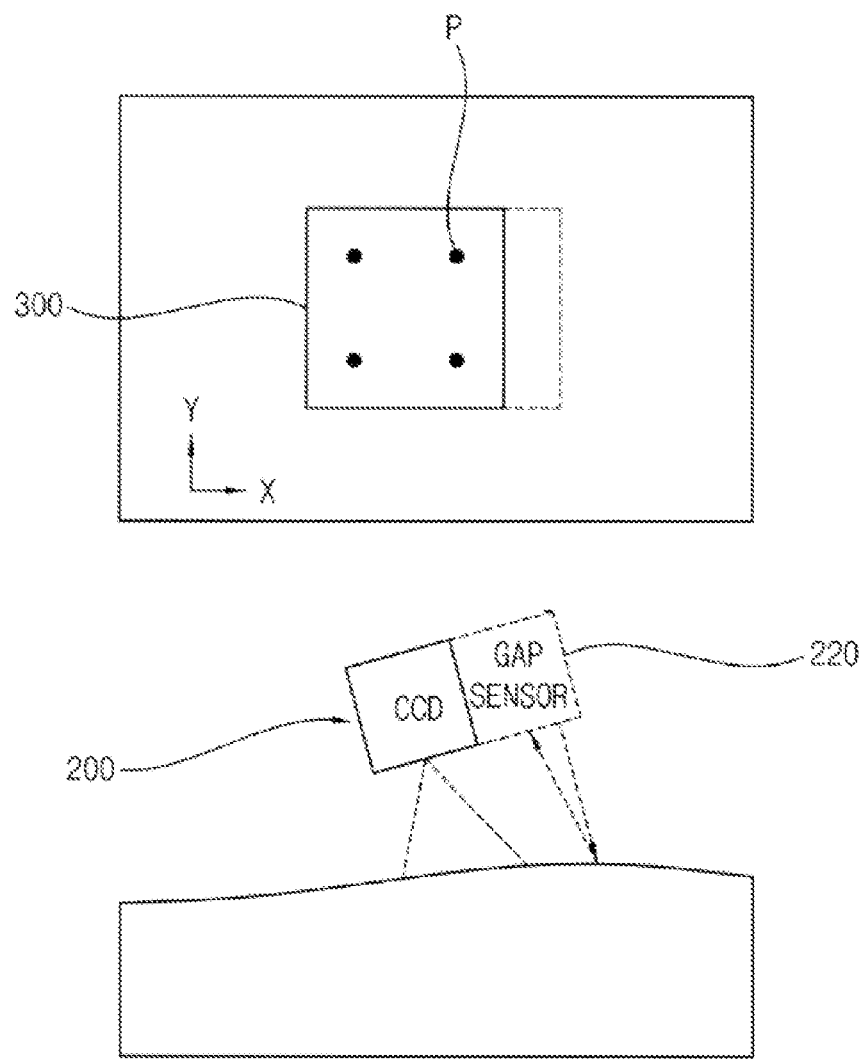

Then, as illustrated in FIG. 5, when the workpiece-origin is positioned on the inclined or curved surface of the workpiece, the distance to the workpiece-origin is measured by the gap sensor 220, and then the measured distance is compared with a reference distance. Then, the Z coordinate (the depth of the workpiece-origin) of the mobile machine tool 100 is compensated by the difference between the measured distance and the reference distance.

Figure 6:
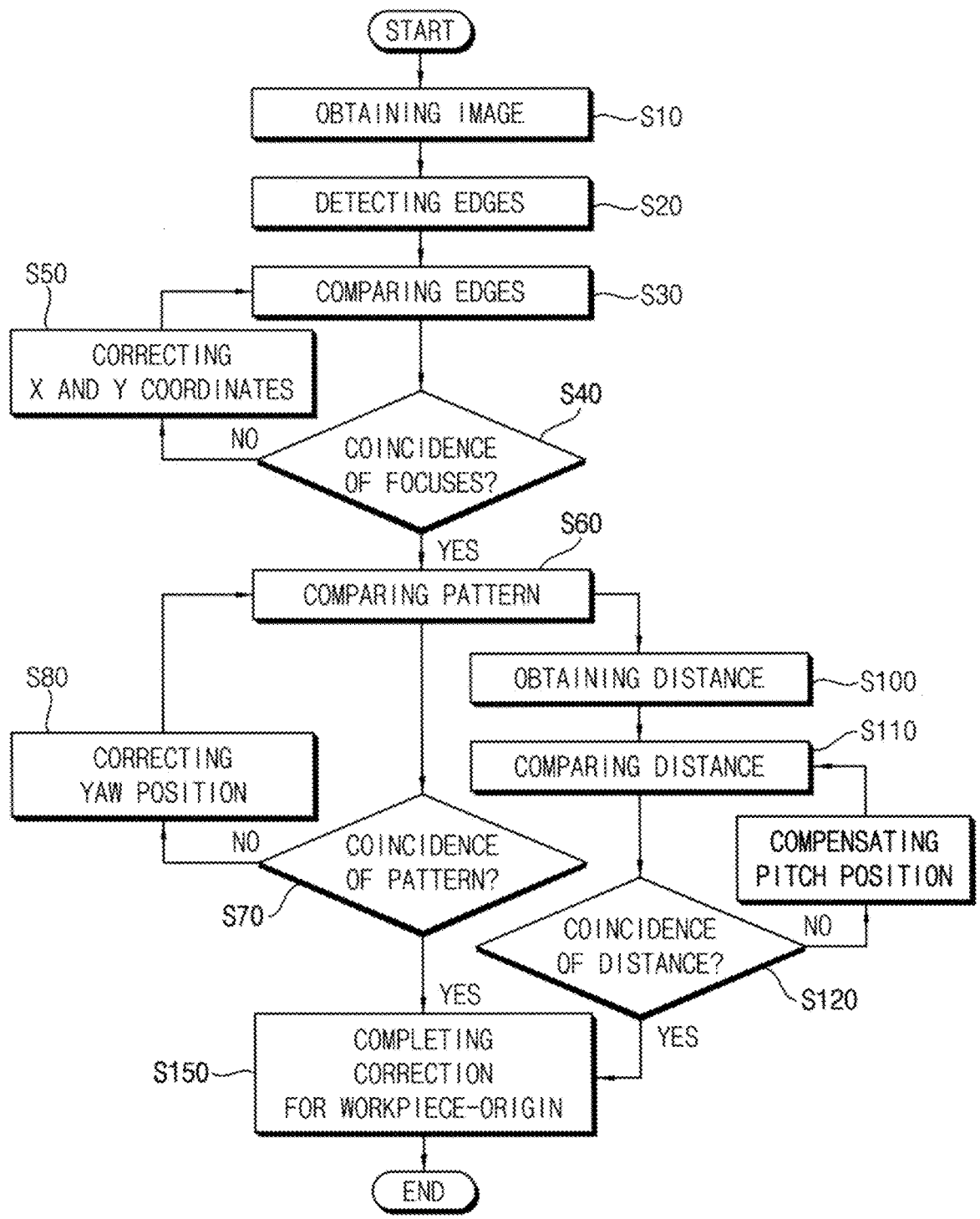
FIG. 6 is a flow chart illustrating the method for self-detecting the workpiece-origin in FIGS. 2 to 5.

FIG. 6 is a flow chart illustrating the method for self-detecting the workpiece-origin in FIGS. 2 to 5.

Referring to FIG. 6, in the method for self-detecting the workpiece-origin, first, the image of the point marked to the workpiece-origin is obtained by the vision sensor 210 (step S10).

Then, edges of the four points are detected (step S20), and the detected edges of the four points are compared with the reference coordinate of the workpiece-origin (step S30).

Generally, in calculating the aligning error, the position of an initial mark is used, and here, the position of the initial mark is defined as a central coordinate of the initial mark.

Here, the initial mark has a circular shape, and thus the algorithm searching a center of the circle is used for obtaining the central coordinate of the initial mark. As the algorithm searching the center of the circle, the moment equilibrium method and the least square method are normally used. In both of the methods, the image from the camera is binarized via a threshold, to divide the circle from the background.

In addition, in the moment equilibrium method, the center of the circle is obtained by using the area of the circle, and in the least square method, the center of the circle is obtained by estimating the boundary of the circle. Further, in the above-mentioned image processing, the illumination is more important than the algorithm searching the center of the circle, and thus halogen illumination and coaxial LED illumination are used.

In using the halogen illumination, scattered reflection occurs, and thus the boundary between the background and the object is ambiguous and the image includes noise, so that the moment equilibrium method having strength on the noise may be normally used. However, in using the coaxial LED illumination, the boundary is relatively clearer, so that the least square method may be normally used.

Figure 7:
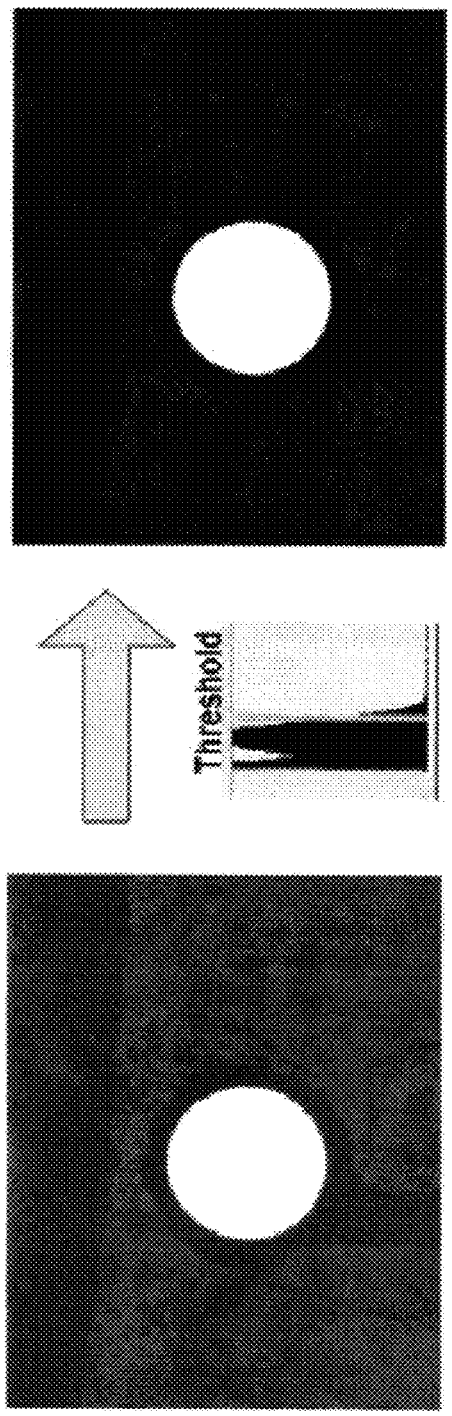
FIG. 7 is an image showing an image binarization in the method of FIG. 6.

In the moment equilibrium method, the obtained image is firstly binarized to be divided. FIG. 7 is an image showing an image binarization in the method of FIG. 6. Here, the reference value for the binarization is predetermined, and is defined as a threshold value. To obtain the central coordinates in the image obtained by the binarization, is substantially same as to obtain a center of gravity.

Equation 1 is used to obtain the central coordinates, and in Equation 1, $x_i$ is defined as a pixel coordinate of the X axis, $y_i$ is defined as a pixel coordinate of the Y axis, and N is a number of pixels of the divided image.

$$\bar{x} = \frac{\sum_i^N x_i}{N}, \bar{y} = \frac{\sum_i^N y_i}{N} \quad \text{[Equation 1]}$$

Accordingly, the X and Y coordinates of the workpiece-origin is detected.

Then, the coincidence of focuses of the points is decided (step S40). Here, when the focuses are not coincided with each other, the mobile machine tool 100 is moved to correct the X and Y coordinates (step S50) and then the edges of the four points are compared again (step S30). However, when the focuses are coincided with each other, the X and Y coordinates of the workpiece-origin are considered to be corrected completely.

Here, in the processing of the workpiece-origin, auto-focusing is performed to the image relative with respect to the initial point image generated at an arbitrary position, and when the processed image is within a predetermined matching range, the X, Y and θ coordinates of the processed image is provided to the machine tool 100.

Then, a reference pattern of the point P is extracted, and then the pattern is compared using the image obtained by the step S10 (step S60). Then, the coincidence of the pattern is decided (step S70), and when the pattern is not coincided with each other, the machine tool 100 is moved to correct the tiling position along the yaw axis (step S80), and then the pattern is compared again (step S60). Here, when the pattern is coincided with each other, the yaw angle of the workpiece-origin is considered to be corrected completely.

In addition, after comparing the pattern (step S60), the distance between the machine tool 100 and the point P are obtained (step S100). Then, the obtained distance in the step S100, is compared with the reference distance (step S110).

Then, the coincidence of the obtained distance with the reference distance is decided (step S120), and then when the distance is not coincided with each other, the machine tool 100 is moved to correct the titling position along a pitch axis (step S130) and the distance is compared again (step S110). Here, when the distance is coincided with each other, the pitch angle of the workpiece-origin is considered to be corrected completely. In the above-mentioned pitch angle correction is performed at the same time with the above-mentioned yaw angle correction, or is performed after the above-mentioned yaw angle correction.

According to the present example embodiments, the workpiece-origin may be accurately and precisely detected in the mobile machine tool, and thus the mobile machine tool may easily process the machining or the drilling on a surface of a relatively large sized workpiece. In addition, the mobile machine tool may easily process the additional machining or maintaining woks to the large sized workpiece without disassembling the workpiece.

In addition, the workpiece-origin may be accurately and precisely detected, so that the machining or the drilling may be performed accurately and precisely in the mobile machine tool.

In addition, the nose may be less affective in the machining or the drilling using the mobile machine tool.

In addition, the vision sensor obtaining the image of the workpiece-origin and the gap sensor measuring the depth of the workpiece-origin are used, and thus the workpiece-origin of the workpiece may be detected without contact.

In addition, the alignment of the workpiece is processed with an image, and the deviation of the workpiece from a reference coordinate is correctly detected, and then the position of the workpiece-origin is calculated to be transferred to the machine tool, so that the aligning error may be minimized.

In addition, the tiling correction is performed to increase the recognition or the detection of the workpiece-origin on a curved surface of the workpiece. Thus, the workpiece-origin is correctly detected on the curved surface of the workpiece, and thus, the machining or the drilling using the mobile machine tool may be accurately or precisely performed for the relatively large sized workpiece with various kinds of curved surfaces such as an aircraft, a vessel and so on.

Having described the example embodiments of the present invention and its advantage, it is noted that various changes, substitutions and alterations can be made herein without departing from the spirit and scope of the invention as defined by appended claims.

What is claimed is:

1. A mobile machine tool comprising:
    a body;
    a machining tool equipped to the body and configured to perform machining of a workpiece;
    a mover configured to move the body along a surface of the workpiece;
    a height controller disposed between the mover and the body and configured to control a distance between the mover and the body and to adjust a tilt angle of the body relative to the surface of the workpiece by controlling the distance;
    a main controller configured to control the machining of the machining tool and a movement of the mover and a height of the height controller; and
    a detecting apparatus having a vision sensor and configured to obtain a point image of a point marked to the workpiece and compare the obtained point image to a reference image of the point so as to determine a position of a beginning point for machining the workpiece based on whether a focus of the obtained image is coincident with a focus of a reference coordinate of the reference image, which reference image comprises a workpiece-origin,
    wherein the main controller is configured to control the mover and the height controller so that the point image obtained from the vision sensor is brought into focus and so that the vision sensor determines the position of the beginning point based on the coincidence of a focus of the obtained point image with the focus of the reference coordinate of the reference image.

2. The mobile machine tool of claim 1,
    wherein the detecting apparatus further comprises a gap sensor configured to detect a distance to the marked point, and
    wherein the main controller is configured to adjust a depth of the position of the beginning point based on a comparison between the distance and a reference distance, by correcting a distance between the machining tool and the workpiece.

3. A method of detecting the workpiece-origin, the method comprising:
    providing the mobile machine tool according to claim 2;
    using the gap sensor to detect the distance to the marked point;
    comparing the distance with the reference distance;
    deciding the coincidence of the detected distance with the reference distance; and
    adjusting the depth of the position of the beginning point based on the comparison between the distance and the reference distance, by correcting the distance between the machining tool and the workpiece when the detected distance does not coincide with the reference distance.

4. The mobile machine tool of claim 1, wherein the vision sensor is configured to obtain an image of a templet, and wherein the main controller is configured to adjust the tilt angle of the body when a shape of the obtained image of the templet is different from a rectangular shape so that the obtained image of the templet is the rectangular shape.

5. A method of detecting the workpiece-origin, the method comprising:
    providing the mobile machine tool according to claim 1;
    obtaining, using the vision sensor, the point image of the point marked to the workpiece;
    deciding the coincidence of the focus of the point image with the focus of a reference coordinate of the reference image; and
    moving the mobile machine tool to correct an X coordinate and a Y coordinate, when the focus of the point image is not coincided with the focus of the reference coordinate of the reference image.

* * * * *